United States Patent [19]

Allison et al.

[11] Patent Number: 4,710,305

[45] Date of Patent: Dec. 1, 1987

[54] PROCESSES AND OXIDIZING AGENTS FOR OXIDIZING SULFIDE ION TO INNOCUOUS, SOLUBLE SULFUR SPECIES

[75] Inventors: Joe D. Allison; J. W. Wimberley, both of Ponca City, Okla.

[73] Assignee: Conoco Inc., Ponca City, Okla.

[21] Appl. No.: 947,327

[22] Filed: Dec. 29, 1986

[51] Int. Cl.$^4$ ............................................. C02F 1/76
[52] U.S. Cl. ........................... 210/747; 210/755; 210/758; 210/916
[58] Field of Search .............. 210/721, 738, 755, 758, 210/766, 916, 747; 166/267; 423/226, 228, 243, 571, 573 R

[56] References Cited

U.S. PATENT DOCUMENTS

| | | | |
|---|---|---|---|
| 3,907,794 | 9/1975 | Carlson et al. | 260/248 |
| 3,951,796 | 4/1976 | Kemper | 210/255 |
| 3,963,611 | 6/1976 | Dardenne-Ankringa, Jr. | 210/63 |
| 4,076,621 | 2/1978 | Hardison | 210/60 |
| 4,139,597 | 2/1979 | Kohler et al. | 423/243 |
| 4,283,379 | 8/1981 | Fenton et al. | 423/226 X |
| 4,292,293 | 9/1981 | Johnson et al. | 423/571 |
| 4,412,981 | 11/1983 | Kubicek | 423/573 |

FOREIGN PATENT DOCUMENTS 1111198 1/1960 Fed. Rep. of Germany .

Primary Examiner—Tom Wyse
Attorney, Agent, or Firm—A. Joe Reinert

[57] ABSTRACT

Processes and oxidizing agents for oxidizing sulfide ion found in sour water to innocuous, soluble sulfur species are provided. The processes basically comprise contacting the sour water with a nitrogen halogenated triazine or a nitrogen halogenated derivative thereof for a period of time sufficient to convert the sulfide ion to sulfate ion. The processes are particularly useful for removing sulfide ion from oil field produced waters, particularly waters associated with secondary recovery or enhanced oil recovery operations.

32 Claims, 2 Drawing Figures

PROCESSES AND OXIDIZING AGENTS FOR OXIDIZING SULFIDE ION TO INNOCUOUS, SOLUBLE SULFUR SPECIES

BACKGROUND OF THE INVENTION

1. Field of the Invention

The present invention relates generally to processes and oxidizing agents for oxidizing sulfide to innocuous, soluble sulfur species, and more particularly, but not by way of limitation, to processes and oxidizing agents for oxidizing sulfide ion in sour water to sulfate ion.

2. Description of the Prior Art

Sulfide ion is a naturally occurring species that can be a serious problem in many mining, metallurgical and chemical operations. The ion increases corrosivity of water and can be an environmental hazard. It is particularly a problem in the petroleum industry.

When oil is first produced from a subterranean oil formation, there is usually sufficient pressure to force the oil to at least the bottom of the well bore so that it can be pumped out. After a period of time, the pressure sometimes decreases and is no longer sufficient to displace the oil from the reservoir. Due to the fact that a large portion of oil still remains in the formation after the primary production period has ended, a number of enhanced oil recovery techniques have been developed.

Flooding the formation with water and/or other aqueous solutions is a common secondary recovery or enhanced oil recovery technique. The water is injected into the formation by way of one or more injection wells to drive the remaining oil toward one or more production wells. The oil and water are then pumped out of the production well or wells. In some areas, the only available water for enhanced oil recovery projects muste be produced directly from the oil fields.

Unfortunately, oil field produced waters often contain a high content of aqueous hydrogen sulfide. Water contaminated with sulfide ion, commonly referred to as sour water, is very undesirable. The contaminated water can be highly toxic by inhalation, and is a strong irritant to eyes and mucous membranes. It can also be very corrosive. The bad attributes of sour water make it undesirable for use in flooding operations, and make it very difficult to dispose of.

There are chemicals that are sometimes added to injection water, particularly biocides, that can react with the hydrogen sulfide to form elemental sulfur particles that are difficult to handle. The hydrogen sulfide may react with pipeline steel to form finely divided ferrous particles. Both elemental sulfur and ferrous particles can plug the reservoir face if they are injected into the reservoir prior to being treated.

Regardless of whether sour water is contaminated by sulfide ion from the reservoir or contaminated by sulfide ion prior to injection in the reservoir, it is difficult to dispose of. The disposal difficulties are due to the environmental and health hazards associated with the water. Permission from governmental agencies for sour water disposal is difficult to obtain. Recycling sour water increases corrosion inhibitor treatment requirements and increases the potential for chemical incompatibility problems.

In order to solve or lessen the problems associated with sour water, the toxic sulfide ion can be removed or converted into a relatively safe species.

Various processes exist for removing sulfide ion from sour water. For example, hydrogen peroxide or chlorine may be used to oxidize the sulfide ion to elemental sulfur. These processes are suitable for systems that can handle elemental sulfur as an end product. In many applications, however, the precipitated solid sulfur is not desirable. This is particularly true in closed systems that may become blocked. The precipitated sulfur is colloidal in size and is difficult to filter. The market for elemental sulfur is primarily confined to industrial areas where the sulfur is converted to sulfuric acid. Many of the areas where sour water is produced are too far from industrial chemical processing plants for marketing of the sulfur to be feasible.

Thus, there is a need for a process for converting sulfide ion in sour water to noncorrosive, innocuous, soluble sulfur species.

SUMMARY OF THE INVENTION

A process for oxidizing sulfide ion found in sour water to innocuous, noncorrosive, soluble sulfur species is provided. The sour water is contacted with a nitrogen halogenated triazine or a nitrogen halogenated derivative thereof for a period of time sufficient to convert the sulfide ion to the soluble sulfur species. Nitrogen chlorinated triazine or nitrogen chlorinated derivatives of triazine are preferred. Particularly suitable such compounds are those selected from the group consisting of nitrogen chlorinated oxytriazines, hydroxytriazines, melamines including triethylenemelamine, guanamines, halotriazines, haloalkyltriazines and cyaphenine. Within that group, nitrogen chlorinated oxytriazines and hydroxytriazines are preferred. Trichlorostriazinetrione is the most preferred.

The process is particularly useful for removing sulfide ion from oil field produced waters, particularly waters associated with secondary recovery or enhanced oil recovery processes. The sulfide ion in the water is converted to sulfate ion.

From the foregoing description of the present invention, it will be apparent that an important object of the invention is to provide a process for converting sulfide ion contained in sour water to noncorrosive, innocuous, soluble sulfur species. The process increases waterflooding capabilities and makes disposal of the emerging waters easier to handle and environmentally safe.

Numerous other objects, features and advantages of the present invention will be readily apparent to those skilled in the art upon a reading of the following disclosure when taken in conjunction with the accompanying drawings.

DETAILED DESCRIPTION OF THE PREFERRED EMBODIMENTS

Figure 1:
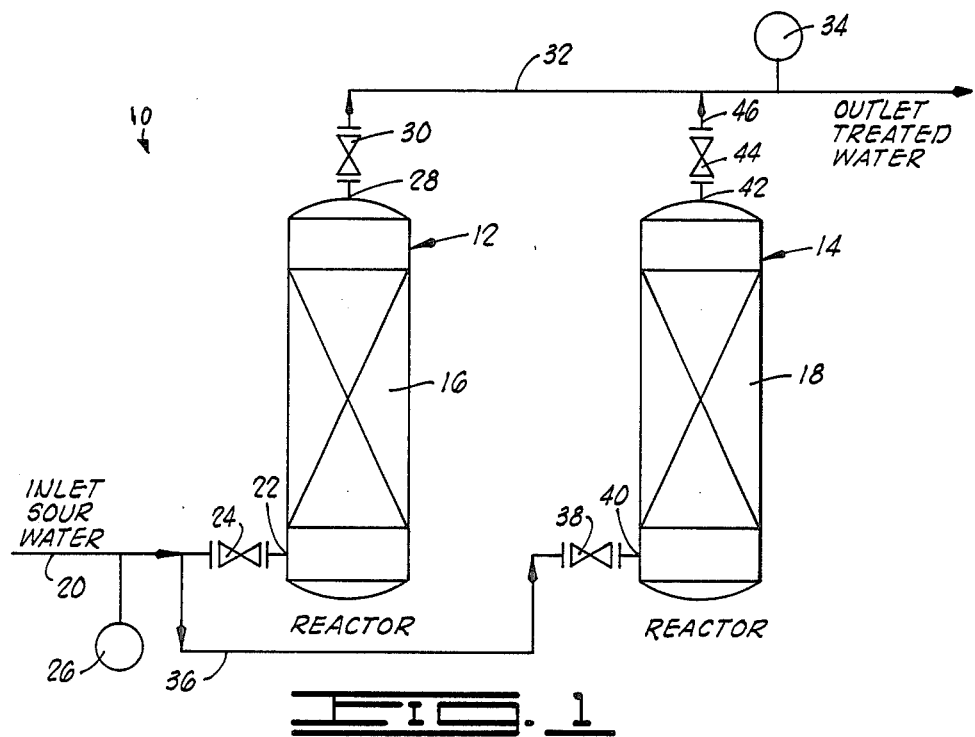
FIG. 1 is a schematic diagram of a reactor that may be utilized in accordance with the process of the present invention.

In accordance with the present invention, a process for oxidizing sulfide ion found in sour water to innocuous, soluble sulfur species is provided. The process is comprised of contacting the sour water with a nitrogen halogenated triazine or a nitrogen halogenated derivative of triazine for a period of time sufficient to convert the sulfide ion to the soluble sulfur species. The process can be used to oxidize sulfide ion to innocuous, soluble sulfur species in any type of operation utilizing or associated with a solution containing sulfide ion. The nitrogen halogenated triazine or the nitrogen halogenated derivative thereof functions as a specific oxidizing agent.

The process is particularly useful to remove sulfide ion from oil field produced waters. The waters are directed into a reaction chamber that contains the nitrogen halogenated triazine or the nitrogen halogenated derivative thereof. The waters are contacted with the oxidizing agent within the chamber to convert sulfide ion to sulfate ion therein. The waters are then withdrawn from the chamber to a place of storage or disposal.

Triazine has the following structural formula:

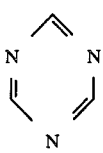

Triazine can be halogenated to form a compound of the formula

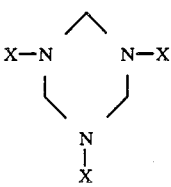

wherein X is a halogen such as chlorine, fluorine, bromine or iodine.

Any nitrogen halogenated triazine or nitrogen halogenated derivative thereof may be used. Preferably, the triazine or derivative thereof is halogenated with chlorine. Particularly suitable such chlorinated compounds are nitrogen chlorinated oxytriazines, hydroxytriazines, melamines, e.g. triethylenemelamine, guanamines, halotriazines, haloalkyltriazines and cyaphenine. The N-Cl bond or bonds of the compounds make them effective oxidizing agents for oxidizing sulfide ion to soluble sulfur species. The chlorine from the compounds is readily released in aqueous solutions and serves as a powerful oxidant.

Of the nitrogen chlorinated triazines or nitrogen chlorinated derivatives thereof, nitrogen chlorinated oxytriazines and nitrogen chlorinated hydroxytriazines are preferred. Trichloro-s-triazinetrione is the most preferred.

Trichloro-s-triazinetrione, or trichloroisocyanuric acid, has the following structural formula:

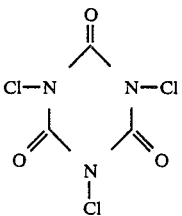

Trichloro-s-triazinetrione oxidizes sulfide ion to sulfate ion as follow:

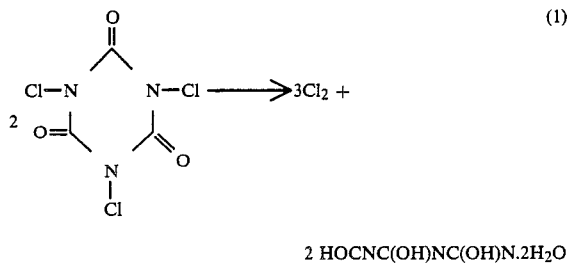

$$S^= + Cl_2 + H_2O \rightarrow S° + 2Cl^- + H_2O \quad (2)$$

$$S° + 3Cl_2 + 4H_2O \rightarrow SO_4^= + 6Cl^- + 8H^+ \quad (3)$$

As shown in Equation (1), the trichloro-s-triazinetrione decomposes in aqueous solutions to form chlorine and cyanuric acid. When placed in an aqueous solution containing sulfide ion, the chloride released from trichloro-s-triazinetrione oxidizes the sulfide ion to elemental sulfur ($S°$). This is shown in Equation (2). The elemental sulfur precipitate formed is then oxidized to sulfate ion ($SO_4=$), which is redissolved in the solution. The final oxidizing step is shown in Equation (3).

Thus, there are two oxidation steps in the reaction. There are two possible oxidizing agents or oxidants in the system, chlorine ($Cl_2$) and chloramine ($NH_2Cl$).

The rate of the reaction, particularly the second oxidation step, can be increased substantially by increasing the temperature of the reaction. Preferably, the temperature at (ILLEGIBLE) temperature of the reaction. Preferably, the temperature at which the reaction is carried out is in the range of from about 15° C. to about 100° C. The most preferred reaction temperature is about 55° C.

The time required to convert the sulfide ion to sulfate ion can be reduced even further by the addition of one or more surface active agents to the sour water. The surfactants wet the surface of the precipitated sulfur particles and hold them in suspension in the solution. The suspension of the sulfur precipitate is significant in that it allows time for one or both oxidants to attack the sulfur particles whereby they are oxidized to sulfate ion and the sulfate ion is redissolved in the solution.

Prior to contacting the sour water with the nitrogen halogenated triazine or the nitrogen halogenated derivative thereof, the pH of the sour water can optionally be adjusted to a level which further minimizes the reaction time. Alkaline conditions favor the formation of sulfate ion from sulfide ion. The pH is preferably adjusted to a level in the range of from about 5 to about 11. Any conventional method may be used to alter the pH. For example, ammonium hydroxide, sodium hydroxide or any other compound having a relatively high pH may be added to or mixed with the sour water.

The process of the present invention is preferably carried out in a closed system using a reactor containing a bed of the solid oxidizing agent used. The oxidizing agent is preferably present in the reactor in an amount in the range of from about 0.006 to about 0.055 pounds per gallon per hour of sour water throughput. 0.033 pounds per gallon per hour of sour water throughput is most preferred. The surface area of contact between the oxidizing agent used and the sour water should be as great as possible.

Two or more reactors can optionally be utilized to carry out the process of the present invention. The sulfide contaminated water can be directed through a first reactor until the solid oxidant contained therein is no longer sufficient to convert the sulfide ion to soluble sulfur species. The sulfide contaminated water is then directed into the second reactor. This allows the spent oxidizing agent in the first reactor to be replaced without ceasing operations.

The process of the present invention can optionally include the steps of monitoring the water at both the influent and effluent ends of the reactor. The water can be monitored prior to the step of directing the water into the reaction chamber to determine the concentration of sulfide ion in the water, thereby determining the time that the water should remain in the reaction chamber. The rate of flow of the sour water through the reaction chamber can be increased or decreased accordingly. The greater the concentration of sulfide ion, the greater the time required for conversion. The water can be monitored after the water is withdrawn from the chamber but before the water is disposed of to either determine the concentration of sulfide ion or determine the concentration of sulfate ion contained therein. In this way, it can be determined when the oxidant should be replaced.

A preferred reactor system for carrying out the process of the present invention is illustrated in FIG. 1 of the drawings and generally designated by the numeral 10. The system 10 is comprised of a pair of reactors 12 and 14 each of which is packed with a bed 16 and 18, respectively, of oxidizing agent, e.g. trichloro-s-triazinetrione. The inlet sour water is directed through a conduit 20 into an inlet 22 of the reactor 12 by way of a shutoff valve 24 connected thereto. Prior to entering the reactor, the water is monitored by a sulfide ion monitor 26 to determine the time that the water should remain in the reactor and the flow rate of the water. The water is contacted with the oxidizing agent as it flows through the reactor 12. As a result, the sulfide ion is converted to sulfate ion within the reactor 12. The reacted water containing dissolved sulfate ion is directed through an outlet 28 attached to the reactor 12 into a conduit 32 having a shutoff valve 30 disposed therein. Prior to being stored or disposed of, the water is monitored by a second monitor 34 connected to the conduit 32 which detects the concentration of sulfide ion or of sulfate ion contained therein to thereby determine when the oxidizing agent in the reactor 12 is spent.

The second reactor 14 is connected to the inlet sour water conduit 20 by a conduit 36, shutoff valve 38 and inlet connection 40 attached thereto. An outlet connection 42 attached to the reactor 14 is connected to the outlet water conduit 32 by a shutoff valve 44 and conduit 46.

As will be understood by those skilled in the art, when the oxidizing agent within the reactor 12 becomes spent, the shutoff valves 38 and 44 are opened and the shutoff valves 24 and 28 are closed whereby the inlet sour water is routed through the reactor 14 and the reactor 12 is isolated. The bed 16 of spent oxidizing agent in the reactor 12 is replaced so that when the oxidizing agent in the reactor 14 becomes spent, the water can be again routed through the reactor 12, and so on.

In order to illustrate and facilitate a clear understanding of the process of this invention, the following examples are given.

EXAMPLE I

Solid trichloro-s-triazinetrione is tested for its ability to oxidize sulfide ion to sulfate ion. A solution of sulfide ion having a concentration of 300 ppm and one percent (1%) sodium chloride is used to simulate sour production water. The sulfide ion is monitored using an ion specific electrode. The pH of the solution is 8.5.

A solid piece of trichloro-s-triazinetrione weighting 0.84 grams is added to the solution. The test is carried out in an open beaker on a hot plate stirrer. The temperature at the time of the reaction is 110° F.

A white precipitate (elemental sulfur) falls out of solution soon after the trichloro-s-triazinetrione is added. Upon depletion of the sulfide ion, the precipitate is gradually dissolved to give a clear solution. It takes approximately fifteen minutes from the time the trichloro-s-triazinetrione is added to the solution for the precipitate to be converted to sulfate ion and the sulfate ion to redissolve to give a clear solution.

Upon retrival and drying, the trichloro-s-triazinetrione specimen weighes 0.52 grams. The sulfate concentration of the resulting solution is monitored by ion chromatography and determined to be 872 ppm. Almost all of the sulfide ion is converted to sulfate ion. Thus, trichloro-s-triazinetrione is an effective oxidizing agent for converting sulfide ion in sour water to sulfate ion.

EXAMPLE II

A solution of sodium sulfide ($Na_2S.9H_2O$) is made containing 300 to 400 ppm sulfide ion and one percent (1%) sodium chloride in deionized water. 75 milliliters (mls) of the stock solution are placed and stirred in a 250 milliliter (ml) beaker. The temperature of the solution is 25° C. The millivolt (mv) output of a pH meter equipped with a sulfide ion specific electrode (ISE) and a $A_g/A_gCl$ double junction reference electrode is used to monitor the concentration of sulfide ion present in the solution.

Figure 2:
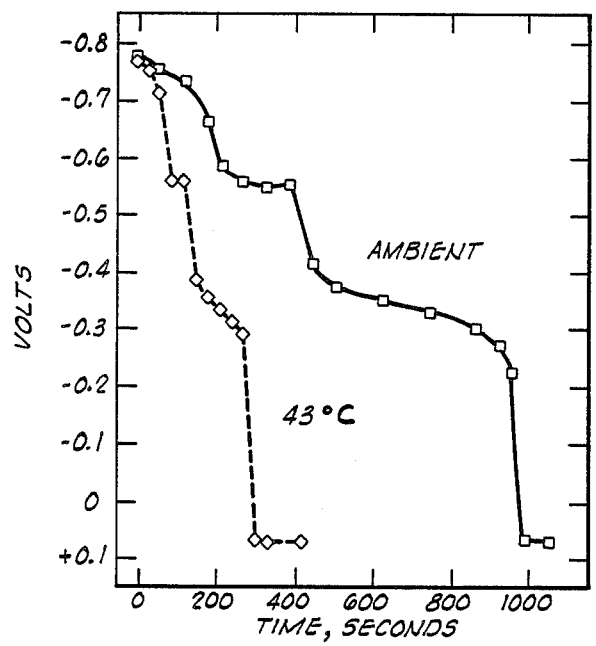
FIG. 2 is a graph showing the operability of trichloro-s-triazinetrione in converting sulfide ion to soluble sulfur species.

A one gram "chunk" of trichloro-s-triazinetrione is added to the stirred sulfide ion solution and the time is noted. Millivolt output measurements of the solution are made every 30 seconds thereafter for the duration of the test. These measurements are plotted on a graph of volts versus time which is shown in FIG. 2. The above test is repeated at 43° C. and the measurements are also plotted on the graph shown in FIG. 2.

A white precipitate forms soon after the addition of the trichloro-s-triazinetrione. The precipitate is filtered and confirmed by elemental analysis to be elemental sulfur. The times of disappearance of sulfide ion and precipitated sulfur are given in Table I below. The presence of sulfate is confirmed by ion chromatography.

TABLE I

| Temperature, °C. | Disappearance[1] of Sulfide Ion (min) | Disappearance[2] of Precipitate (min) |
| --- | --- | --- |
| 25 | 16.5 | 120 |
| 43 | 5 | 8 |

[1]Monitored by sulfide ISE
[2]Visually determined

As shown in FIG. 2, the sulfide ion is eliminated slowly in a step-wise fashion. Also, the reaction occurs much more rapidly at 43° C. than at 25° C. Thus, the tests confirm that trichloro-s-triazinetrione effectively oxidizes sulfide ion in solution to dissolved sulfate ion and that the oxidation rate is increased at elevated temperatures.

EXAMPLE III

Trichloro-s-triazinetrione and chlorine are each tested for their ability to oxidize sulfide ion to sulfate ion. The results of each test are compared in Table II below.

A stock solution of sodium sulfide ($Na_2S.9H_2O$) is made containing 300 to 400 ppm sulfide ion and one percent (1%) sodium chloride in deionized water. A 250 milliliter (ml) beaker is used for each test. 75 milliliters (mls) of the stock solution are placed and stirred in each beaker. A sulfide ion specific electrode (ISE) is used to monitor the concentration of sulfide ion present in the solutions. The temperature of the solutions is monitored with a thermometer.

A one gram "chuck" of trichloro-s-triazinetrione is added to the stirred sulfide ion solution contained in the first beaker, and the time is noted.

A gas dispersion tube (medium fritted glass) is introduced to the stirred sulfide ion solution contained in the second beaker. Chlorine gas ($Cl_2$) is then purged through the reaction solution at a rate of 150 milliliters (mls) per minute as adjusted with a chlorine gas regulator. The time is noted when the chlorine is first introduced to the solution.

The temperature of the solution contained in each beaker is 25° C. Millivolt output measurements of each solution are made every 30 seconds for the duration of the tests. The test of trichloro-s-triazinetrione is repeated at 43° C. The test of chlorine is repeated at 41° C. and at 71° C. The temperature of the solutions is raised by placing the beakers on hot plates.

In each test, a white precipitate forms soon after the addition of the oxidant. The precipitate is filtered and determined by elemental analysis to be elemental sulfur. The times of disappearance of sulfide ion and precipitated sulfur for each test are given in Table II below. The presence of sulfate is confirmed by ion chromatography.

TABLE II

| Oxidizing Agent | Temperature, °C. | Disappearance[1] of Sulfide Ion (min) | Disappearance[2] of Precipitate (min) |
| --- | --- | --- | --- |
| trichloro-s-triazinetrione | 25 | 16.5 | 120 |
| trichloro-s-triazinetrione | 43 | 5 | 8 |
| chlorine | 25 | 6.5 | 70 |
| chlorine | 41 | 8 | 45 |
| chlorine | 71 | 6.5 | 25 |

[1]Monitored by sulfide ISE
[2]Visually determined

The tests illustrate that sulfide ion is oxidized much more rapidly by trichloro-s-triazinetrione at an elevated temperature than by chlorine.

From the above, it can be seen that the processes and oxidizing agents of the present invention can be utilized to oxidize sulfide ion found in sour water to innocuous, soluble sulfur species. The processes and oxidizing agents of the present invention readily achieve the ends and advantages mentioned as well as those inherent therein. While certain preferred embodiments of the present invention have been illustrated and described for the purposes of the present disclosure, numerous changes in the arrangement and exact manner of performance of the various steps may be made by those skilled in the art, which changes are encompassed within the scope and spirit of the invention as defined by the appended claims.

The embodiments of the invention in which an exclusive property or privilege is claimed are as follows:

1. A process for oxidizing sulfide ion found in sour water to innocuous, soluble sulfur species, comprising:
   contacting said sour water with a nitrogen halogenated triazine or a nitrogen halogenated derivative thereof for a period of time sufficient to convert said sulfide ion to soluble sulfur species.

2. The process of claim 1, wherein said nitrogen halogenated triazine or nitrogen halogenated derivative thereof is a nitrogen chlorinated triazine or a nitrogen chlorinated derivative thereof.

3. The process of claim 2 wherein said nitrogen chlorinated triazine or nitrogen chlorinated derivative thereof is selected from the group consisting of nitrogen chlorinated oxytriazines, hydroxytriazines, melamines, guanamines, halotriazines, haloalkyltriazines and cyaphenine.

4. The process of claim 2 wherein said nitrogen chlorinated triazine or nitrogen chlorinated derivative thereof is selected from the group consisting of nitrogen chlorinated oxytriazines and nitrogen chlorinated hydroxytriazines.

5. The process of claim 2 wherein said nitrogen chlorinated triazine or nitrogen chlorinated derivative thereof is trichloro-s-triazinetrione.

6. The process of claim 1, wherein said process is carried out at a temperature in the range of from about 15° C. to about 100° C.

7. The process of claim 6, wherein said temperature is about 55° C.

8. The process of claim 1, which is further characterized to include the step of
   prior to contacting said sour water with said nitrogen halogenated triazine or nitrogen halogenated derivative thereof, adjusting the pH of said sour water to a level which minimizes the time required to convert said sulfide ion to soluble sulfur species.

9. The process of claim 8, wherein said pH is adjusted to a level in the range of from about 6 to about 11.

10. The process of claim 1, wherein said sour water is contacted with said nitrogen halogenated triazine or nitrogen halogenated derivative thereof in a closed system.

11. The process of claim 10, wherein said nitrogen halogenated triazine or nitrogen halogenated derivative thereof is solid trichloro-s-triazinetrione, and said closed system comprises at least one reactor containing a bed of said solid trichloro-s-triazinetrione.

12. The process of claim 11, wherein said trichloro-s-triazinetrione is present in said reactor in an amount in the range of from about 0.006 to about 0.055 pounds per gallon per hour of sour water throughput.

13. A process of removing sulfide ion from oil field produced sour water, comprising the steps of:
   directing said water into a reaction chamber containing a nitrogen halogenated triazine or a nitrogen halogenated derivative thereof, whereby said water is contacted with said nitrogen halogenated triazine or nitrogen halogenated derivative thereof and said sulfide ion is converted into sulfate ion within said chamber; and
   withdrawing said water from said chamber to a place of disposal.

14. The process of claim 13, wherein said nitrogen halogenated triazine or said nitrogen halogenated derivative thereof is nitrogen chlorinated triazine or a nitrogen chlorinated derivative thereof.

15. The process of claim 14, wherein said nitrogen chlorinated triazine or nitrogen chlorinated derivative thereof is selected from the group consisting of nitrogen chlorinated oxytriazines, hydroxytriazines, melamines, guanamines, halotriazines, haloalkyltriazines and cyaphenine.

16. The process of claim 14, wherein said nitrogen chlorinated triazine or nitrogen chlorinated derivative thereof is selected from the group consisting of nitrogen chlorinated oxytriazines and hydroxytriazines.

17. The process of claim 14, wherein said nitrogen chlorinated triazine or nitrogen chlorinated derivative thereof is trichloro-s-triazinetrione.

18. The process of claim 17, wherein said reaction chamber comprises a reactor containing a bed of said trichloro-s-triazinetrione.

19. The process of claim 13, which is further characterized to include the step of:
prior to the step of directing said sour water into said reaction chamber, monitoring said sour water to determine the concentration of sulfide ion in said water, thereby determining the time that said water should remain in said reaction chamber.

20. The process of claim 13, which is further characterized to include the step of:
after said water is withdrawn from said chamber but before said water is disposed of, monitoring said water to determine the concentration of sulfide ion therein.

21. In a secondary recovery process for the recovery of hydrocarbons from a subterranean formation wherein an aqueous solution is directed into said formation by way of one or more injection wells, and hydrocarbons and sour water are recoverd from said formation by way of one or more production wells, the improvement comprising contacting said sour water with a nitrogen halogenated triazine or a nitrogen halogenated derivative thereof for a period of time sufficient to convert sulfide ion contained therein to innocuous, soluble sulfur species.

22. The process of claim 21, wherein said nitrogen halogenated triazine or nitrogen halogenated derivative thereof is nitrogen chlorinated triazine or a nitrogen chlorinated derivative thereof.

23. The improvement of claim 22, wherein said nitrogen chlorinated triazine or nitrogen chlorinated derivative thereof is selected from the group consisting of nitrogen chlorinated oxytriazines, hydroxytriazines, melamines, guanamines, halotriazines, haloalkyltriazines and cyaphenine.

24. The improvement of claim 22, wherein said nitrogen chlorinated triazine or nitrogen chlorinated derivative thereof is selected from the group consisting of nitrogen chlorinated oxytriazines and hydroxytriazines.

25. The improvement of claim 22, wherein said nitrogen chlorinated triazine or nitrogen chlorinated derivative thereof is trichloro-s-triazinetrione.

26. The improvement of claim 21, wherein said process is carried out at a temperature in the range of from about 15° C. to about 100° C.

27. The improvement of claim 26, wherein said temperature is about 55° C.

28. The improvement of claim 21, further comprising:
prior to contacting said sour water with said nitrogen halogenated triazine or nitrogen halogenated derivative thereof, adjusting the pH of said sour water to a level which minimizes the time required to convert said sulfide ion to said soluble sulfur species.

29. The improvement of claim 28, wherein said pH is adjusted to a level in the range of from about 6 to about 11.

30. The improvement of claim 21, wherein said sour water is contacted with said nitrogen halogenated triazine or nitrogen halogenated derivative thereof in a closed system.

31. The improvement of claim 30, wherein said nitrogen halogenated triazine or nitrogen halogenated derivative thereof is trichloro-s-triazinetrione, and said closed system comprises a reactor containing a bed of said trichloro-s-triazinetrione.

32. The improvement of claim 31, wherein said trichloro-s-triazinetrione is present in said reactor in an amount in the range of from about 0.006 to about 0.055 pounds per gallon per hour of sour water throughput.

* * * * *